United States Patent

[11] 3,607,776

| [72] | Inventors | John E. Santo |
| | | West New York; |
| | | Philip G. Abend, Teaneck, both of N.J. |
| [21] | Appl. No. | 736,017 |
| [22] | Filed | June 11, 1968 |
| [45] | Patented | Sept. 21, 1971 |
| [73] | Assignee | Pennwalt Corporation |

[54] MANUFACTURE OF INGESTIBLE CAPSULES
13 Claims, No Drawings

[52] U.S. Cl. ..................................... 252/316,
99/168, 117/100 A, 252/182, 264/4, 424/32

[51] Int. Cl. ....................................... B01j 13/02,
B44d 1/02

[50] Field of Search .......................... 252/316;
117/100 O; 424/32; 264/4; 260/78 A; 117/161 P;
99/168

[56] References Cited
UNITED STATES PATENTS

| 2,988,538 | 6/1961 | Thoma et al. .................. | 260/77.5 |
| 3,270,100 | 8/1966 | Jolkovski et al. ............... | 252/316 X |
| 3,272,897 | 9/1966 | Herman et al. ................. | 117/100 X |

FOREIGN PATENTS

| 950,443 | 2/1964 | Great Britain ................ | 264/4 |

*Primary Examiner*—Richard D. Lovering
*Attorneys*—Carl A. Hechmer, Jr. and Stanley Litz ABSTRACT: In encapsulation by interfacial polycondensation between intermediates respectively incorporated in minute droplets of one liquid and in a surrounding, continuous phase of another, immiscible liquid, safely ingestible microcapsules, as for containing substances to be used in or with foods, pharmaceuticals and the like, are prepared by such reaction between an intermediate comprising an amino acid, i.e. an amino carboxylic acid having at least two amine groups capable of the condensation reaction, and a suitable complementary intermediate such as a diacid chloride, e.g. adipoyl chloride, yielding a capsule wall of basically polyamide structure, which may also include anhydride linkages.

MANUFACTURE OF INGESTIBLE CAPSULES

BACKGROUND OF THE INVENTION

1. Field of the Invention

This invention relates to encapsulation and particularly to the production of small or minute capsules constituted by a skin or organic composition enclosing a body of material, e.g. liquid or solid, the capsules being formed by polycondensation of reactants situated respectively at opposite sides of the interface between droplets that initially constitute the material to be encapsulated and a surrounding continuous phase of liquid. More particularly the invention is related to improvement in such capsules and their production, whereby they may be readily ingested as in circumstances of use requiring such characteristic, a specific object being to provide a safely metabolizable capsule wall composition, derived from correspondingly ingestible reactant material. In an important specific aspect, this and other features of advantage contemplated by the invention, in procedure and reactants for encapsulation, are related to polymerization occurring between acid chlorides having at least two reactive groups and complementary agents having at least two reactive amine groups, yielding basically a polyamide.

2. Description of the Prior Art

Methods of encapsulation by interfacial condensation between direct-acting, complementary reactants are know, as for example in British Pat. No. 1,091,141, published Nov. 15, 1967 and French Pat. No. 1,427,085, published Feb. 4, 1966, which describe reactions for producing various types of polymers as the capsule walls. Many of such reactions occur between an amine which must be of at least difunctional character and a coacting substance of acid or more accurately acid-derived nature, which for producing a polyamide is a difunctional or polyfunctional acid chloride. The amines heretofore chiefly used or proposed are typified by ethylene diamine or the like, having at least two primary amino groups.

For many purposes it is desirable that the capsule wall be of safely ingestible composition, as for instance in cases where a chemical agent is microencapsulated for treatment of or inclusion in food materials (e.g. in the case of citrus fruit or other natural produce as explained below), and in cases where pharmaceuticals are microencapsulated, as to obtain special conditions or times of release of orally administered substances. While by selection among the large number of examples of reactants heretofore disclosed for effecting encapsulation by interfacial polycondensation there may be found specific reactant combinations, yielding correspondingly selected polymers, that would provide relative safety of the capsule walls for ingestion in amounts necessary for a given purpose, and while in a number of cases the quantity of capsules likely to be ingested, or available for possible human ingestion is so very small that attainment of toxic levels of any capsule wall ingredient which might be hazardous in large quantities, is impossible in practice, it is nevertheless highly desirable to provide for encapsulation by employment only of reactants that are recognized to be inherently safe, or indeed are in classes of substances either known to be proper for ingestion or even intended for ingestion for other purposes. Maximum assurance of safety is thereby afforded, and moreover there is no need for elaborate and costly testing as might be required to prove that a particular use of microcapsules does not involve any hazard of toxicity respecting the composition of the capsule wall. It is thus of considerable advantage, for example, to avoid the use of amines typified by ethylene diamine, even where the quantities ingested or possible of ingestion may be below any ordinary level of toxicity.

Although other encapsulating techniques, such as for producing microcapsules having a skin or gelatin-gum arabic composition are well known and afford a product safe for ingestion, such procedures are complex and it is desired to make available the simple, rapid and effective operations of producing capsules by interfacial polycondensation. Procedure of the latter type requires only a single, essentially fast reaction, yielding a fully established capsule wall, and is very easily controlled, e.g. as to size, uniformity of the microcapsules, and indeed as to characteristics of the wall or skin itself, with good reproducibility of results. These advantages are notably true of polyamide capsules as produced by acid chlorides and diamines or the like, with consequent emphasis on the need sought to be met by the present invention.

SUMMARY OF THE INVENTION

To the foregoing and other ends, it has now been discovered that microencapsulation by the stated interfacial reaction can be effectuated between appropriately selected diacid chlorides or the like and as the other intermediate, suitable member or members of a class of recognized, safely metabolizable substances, namely amino acids, so as to yield capsule walls, basically of polyamide structure, that present no problem in respect to situations where the capsules may be or are to be ingested. These amino acids are substances, indeed of natural occurrence, which are recognized as appropriate in human and/or animal metabolism, or even required, and they are correspondingly regarded as nontoxic and as proper ingredients or constituents of food grade compositions.

More particularly, the selected class of amino acids, found suitable to function as the amine reactant in polyamide-producing condensation, consists of amino-carboxylic acids having at least two amine groups capable of such reaction with acid chlorides, it being understood that the latter compounds include at least two -COCl groups (sometimes called chloroformyl groups) as in adipoyl chloride or the like. Members of the stated class of amino acids are mostly identifiable as diamino-carboxylic acids, as for instance lysine, arginine, cystine and others.

The production of capsules is effectuated in the basically known manner, for instance as set forth in the aforesaid British and French patents, with the intermediates, namely diacid chloride and the selected amino acid respectively incorporated in two immiscible liquids, one of which represents the material to be encapsulated and is presented as minute droplets occurring in a continuous phase of the other liquid, the capsule wall being attained by condensation reaction at the interface between the droplets and the continuous phase. Thus, for example, if an organic liquid is to be encapsulated, a presently preferred process involves incorporation of the acid chloride in such liquid and establishing a dispersion, e.g. emulsion, of the organic liquid in a body of aqueous liquid. After such formation of minute droplets of the organic liquid containing the acid chloride, the selected amino acid, conveniently embodied in an alkaline aqueous solution, is added to the continuous phase, whereupon with further stirring the polycondensation reaction occurs at the droplet-water interfaces, yielding minute capsules of essentially polyamide structure, which can thereafter be separated, washed and dried. It will be understood that where an aqueous liquid is to be encapsulated, the same steps are advantageously followed, except that the amino acid is included in the liquid which forms the droplets, the continuous phase being an appropriate organic solvent substantially immiscible with water, to which the acid chloride is thereafter added. In all of these operations, advantage can be taken of cooperating features or techniques heretofore developed for encapsulation by interfacial polycondensation, including the provision of cross-linking by use or addition of polyfunctional reactants, meaning reactants having three or more functional groups such as triacid chlorides. Advantages of such cross-linking are the possibility of producing a stronger capsule skin or of controlling the permeability or still other properties of the skin.

A further feature of the present invention is that by the utilization of the defined amino acids, some amount of cross-linking is understood to be obtained or obtainable without supplemental reactants. That is to say, the amino acids, diamino-carboxylic acids, contain one or more carboxyl groups that can react, and indeed appear to react to some extent, with the -COCl groups of the acid chloride to form an anhydride linkage that may thus extend from the amino acid members of the polyamide chain, at localities other than those where amino groups have become linked to the residue of -COCl groups. Some strengthening of the capsule walls appears to be afforded by the cross-linkage, which is thus understood to be inherently attained.

DETAILED DESCRIPTION

It may be explained that these amino acids are commonly or often produced or sold in acid salt form, e.g. hydrochloride, and therefore to make the amine groups available for reaction in such case these substances should be employed in alkaline solution, i.e. above pH 7, as with the presence of alkali metal (e.g. sodium) hydroxide or carbonate. The alkaline environment is also desirable for acid-scavenging, i.e. to promote formation of the polyamide linkages by neutralizing the byproduct acid, but a more or less unavoidable effect of the addition of a base is that the amino acids are then present, or may be considered as present, in alkali metal salt form. The supplemental anhydride reaction, which has been mentioned, then presumably occurs between the groups -COONa and -COCl, yielding nevertheless the above-described anhydride linkage, viz -CO-O-CO-. Although reference will be conveniently made hereinbelow to the employment of amino carboxylic acids and to the presence or reaction of carboxyl groups, such reference will therefore be understood to include the original occurrence of the amino acids in such as the hydrochloride form and likewise the ultimate use or appearance of these compounds in the above-mentioned salt form, e.g. the sodium salt of the acid, and likewise to include the use or reaction of the corresponding salt form of the carboxyl radical.

Among the class of amino carboxylic acids appropriate as intermediates in the encapsulation procedure of the present invention, unusually satisfactory results have been obtained with lysine, which has a molecular structure that includes two primary amino groups (-$NH_2$) and one carboxyl group. Among other substances, likewise in the specific category of diamino carboxylic acids, deemed appropriate for this reaction, e.g. to form polyamide linkage, are cystine, ornithine, and 2,6, diamino-pimelic acid; each of these substances being similarly characterized by two primary amino groups and one or more carboxyl groups. Another example of a suitable amine-type reactant is histidine, which, although having only one primary amino group, has also a heterocycle in which the ring contains a secondary amino group carrying a hydrogen atom on the nitrogen atom. Still further, available members of the class are arginine and hydroxy lysine. As indicated above, all of these materials can advantageously be employed in alkaline environment, at least for acid scavenging, e.g. by including sodium hydroxide or sodium carbonate or both in the aqueous solution of use.

Selection of the acid chloride intermediate, which in most cases will be primarily diacid chloride, may be made from a relatively considerable class of such substances known to be appropriate for encapsulation by polyamide-forming polycondensation, examples of such reactants being adipoyl chloride, sebacoyl chloride, azeloyl chloride, terephthaloyl chloride, dimer acid chloride, trimer acid chloride, trimesoyl chloride, and indeed others as named in the above-cited British and French patents. Dimer acid and trimer acid are produced by polymerization of unsaturated 18-carbon fatty acids. Dimer acid is an aliphatic 36-carbon dibasic acid product having two side chains; trimer acid is an aliphatic 54-carbon tribasic acid product having three side chains. The acid products are available from Emery Industries, Inc., under the trademark Empol. The corresponding diacyl and triacyl chlorides are obtained by conventional chlorination methods.

Adipoyl chloride is presently regarded as of special preference, being recognized, from the standpoint of nontoxicity, as safely appropriate for compositions to be ingested, and being found effective to yield satisfactory microcapsules. Other acid chlorides may be employed, as among the above examples, in accordance with the actual requirements of non-toxicity in a particular case, e.g. having regard to the expected concentration of capsule wall structure in or with the ultimate product where the capsules are employed and also having regard to any limit or tolerance established for the respective acids. Trifunctional or polyfunctional compounds can be used conjointly as part of the acid chloride intermediate, as for example trimer acid chloride, to obtain the benefits of cross-linkage in the polyamide chain structure, such cross-linkage being in addition to cross-linking that may occur by the anhydride formation described above.

The aqueous-phase intermediate may sometimes also include other substances, usually in minor amount, which may function as reactants, particularly diols or polyols. Appropriately ingestible compounds of this character, being food grade materials, are glycols and other polyols, such as propylene glycol, glycerol and sorbitol. Substances of this sort are believed to be capable of introducing supplemental polyester linkages into the resulting capsule wall, i.e. by reaction with the diacid chloride. Although the polymer structure is then perhaps definable as polyamide-polyester or conceivably as still more complex by reason of anhydride linkages, it remains basically polyamide, and references herein to a polyamide skin or a polyamide structure are thus intended to include the polymer compositions that may contain these further linkages, as well as products that may be more or less solely polyamide.

The following are some examples of encapsulation pursuant to the invention, utilizing lysine, $NH_2$-$(CH_2)4$-$CH(COOH)$-$NH_2$, as the diamino acid, it being understood that other amino acids of the class defined above can be similarly employed, and likewise that other difunctional or polyfunctional acid chlorides can be used instead of adipoyl chloride, here selected as functionally representative and because of recognition of adipic acid as unobjectionable in food materials. In each example the liquid encapsulated was diphenyl in liquid form, above its melting point (69° C.), so that the completed capsules contained the substance in solid form, enclosed by the produced polyamide skin. These diphenyl microcapsules have a special use in accordance with another invention, which is separately described and claimed application Ser. No. 736,016 of Robert R. Joiner, filed June 11, 1968, and which is concerned with treatment of fruit or the like with compositions comprising microencapsulated diphenyl whereby release of the volatilized diphenyl through the capsule skin affords a prolonged fungistatic effect.

Other substances can, of course, be encapsulated, including other chemical agents, pharmaceutical agents and the like, embodied (for the process) in liquid form, either inherently or by solution or suspension in a liquid carrier. Where such liquid form functions as an organic solvent for the acid chloride, the condensation intermediates are used as in the examples, and where the liquid to be encapsulated is aqueous, the intermediates are reversed, the amino acid being included in such liquid of the droplets and the diacid chloride in a surrounding continuous phase of organic solvent.

In each instance below, the adipoyl chloride was dissolved in melted diphenyl at a temperature of 70° C. or above, and minute droplets of this solution (to become the ultimate capsules) were obtained by dispersing it, with vigorous agitation, in a body of water as stated. The lysine, supplied as hydrochloride, was then added to the water, in the form of an alkaline aqueous solution, whereupon the polycondensate reaction to produce the capsule walls (basically polyamide) was effected during subsequent stirring, over an interval of the order of one-half to one hour. Satisfactory, very small capsules (e.g. less than 100 microns, preferably less than 20 microns) were obtained.

EXAMPLE 1

| Solution 1. | 50.0 g. | Diphenyl |
| --- | --- | --- |
| | 10.0 g. | Adipoyl Chloride |
| Solution 2. | 11.0 g. | Lysine HCl |
| | 55.0 ml. | NaOH Solution (10 percent) |
| | 30.0 ml. | Water (heated to 70° C.) |

Solution 1 was dispersed in 600 ml. of water (heated to 75° C.) and Solution 2 was added. The mixture was allowed to cool to room temperature with continuous stirring (1,000 r.p.m.) The formed capsules were filtered and washed with deionized water.

EXAMPLE 2

| Solution 1. | 50.0 g. | Diphenyl |
| --- | --- | --- |
| | 10.0 g. | Adipoyl Chloride |
| | 5.0 g. | Dimer-acid Chloride (contains 20 percent Trimer-Acid Chloride) |
| Solution 2. | 11.0 g. | Lysine HCl |
| | 55.0 g. | NaOH (10 percent solution) |
| | 5.0 g. | Glycerol |
| | 30.0 ml. | Water |

The procedure was the same as in example 1. A method of preparing dimer acid chloride (with 20 trimer acid chloride), as for this and some other examples below, is described under example 15 of the patent application of Jan E. Vandegaer, Ser. No. 710,293, filed Mar. 4, 1968.

EXAMPLE 3

| Solution 1. | 50.0 g. | Diphenyl |
| --- | --- | --- |
| | 10.0 g. | Adipoyl Chloride |
| | 5.0 g. | Dimer-Acid Chloride (contains 20 percent Trimer-Acid Chloride) |
| Solution 2. | 11.0 g. | Lysine HCl |
| | 5.0 g. | $Na_2CO_3$ |
| | 5.0 g. | Glycerol |
| | 30.0 ml. | Water |

Here the procedure was again as in example 1, except that the continuous phase of water contained 0.2 grams of Elvanol, a partially hydrolyzed polyvinyl alcohol, as a dispersing agent. The microcapsules were separated by filtration at 60° C.

EXAMPLE 4

| Solution 1. | 50.0 g. | Diphenyl |
| --- | --- | --- |
| | 10.0 g. | Adipoyl Chloride |
| | 5.0 g. | Dimer-Acid Chloride |
| Solution 2. | 11.0 g. | Lysine HCl |
| | 55.0 g. | NaOH (10 percent solution) |
| | 5.0 g. | Glycerol |
| | 30.0 ml. | Water |

The body of water, for dispersion of solution 1, was 600 ml. of water, containing 3.0 g. of Elvanol, and was heated to 85° C. Solution 1 was heated to about 75° C. and dispersed in about 300 ml. of the above Elvanol solution, using a Waring Blender. The resulting emulsion was diluted with the remainder of the water (Elvanol solution), and was stirred (300 r.p.m.) while adding solution 2. The batch was centrifuged at about 60° C. to separate the basically polyamide-walled microcapsules of diphenyl. Analysis with a conventional instrument indicated an average particle size of 8 microns capsule diameter. Capsules made as above are specially useful for fungistatic effect of diphenyl, in coatings on citrus fruit.

EXAMPLE 5

| Solution 1. | 50.0 g. | Diphenyl |
| --- | --- | --- |
| | 11.0 g. | Adipoly Chloride |
| Solution 2. | 11.0 g. | Lysine HCl |
| | 5.0 g. | $Na_2CO_3$ |
| | 5.0 g. | Glycerol |
| | 30.0 ml. | Water |

Solution 1 was heated to 80° C. and dispersed in the water, being 600 ml. of water containing 0.2 g. Elvanol, at 80° C. with the aid of ultrasonic agitation, yielding extremely small droplets. The emulsion was transferred to another vessel, and stirred in an ordinary manner while adding solution 2. By the described interfacial polymerization reaction, the microcapsules were formed. They were allowed to settle, and then were removed by filtration and air dried.

Another diamino acid in the form of the naturally occurring amino acid cystine, levo-rotatory L-cystine, $HOOC-CH(NH_2)-CH_2-SS-CH_2-CH(NH_2)-COOH$, also was utilized in the formation of microcapsules, as illustrated in the following example:

EXAMPLE 6

| Solution 1. | 25.0 g. | Diphenyl |
| --- | --- | --- |
| | 5.5 g. | Adipoyl Chloride |
| Solution 2. | 5.5 g. | Cystine |
| | 4.0 g. | $Na_2CO_3$ |
| | 2.5 g. | Glycerol |
| | 150.0 ml. | Water |

The body of water for dispersion of solution 1, was 300 ml. water, containing 0.1 g. Elvanol Solution 1 was heated to 72° C. and dispersed in the above, similarly heated Elvanol solution, using a laboratory stirrer followed by ultrasonic agitation to obtain extremely small droplets. Solution 2 then was added while stirring. The capsules were allowed to settle, then separated by filtration, washed and air dried. Microscopic observation confirmed the formation of microcapsules.

It is to be understood that the invention is not limited to the specific compounds and operations herein described but may be carried out in other ways without departure from its spirit.

We claim:

1. In a process of encapsulation by interfacial condensation of a pair of polyamide-forming intermediates respectively incorporated in two substantially immiscible liquids, the procedure in which one of the intermediates comprises acid chloride having at least two functional -COCl groups and the other intermediate comprises an amino carboxylic acid having at least two amine groups capable of condensation reaction with -COCl groups selected from the class consisting of cystine, lysine, hydroxy lysine, ornithine, arginine, 2,6-diamino-pimelic acid and histidine, said process comprising establishing droplets of one liquid in a continuous phase of the other liquid, and incorporating said intermediates respectively in the liquid for polycondensation reaction between the intermediates at the interfaces of the droplets and the continuous liquid phase, to encapsulate the droplets in a polyamide skin.

2. A process as defined in claim 1, in which the amino carboxylic acid is lysine.

3. A process as defined in claim 2, in which the acid chloride is adipoyl chloride.

4. A process as defined in claim 1, in which the liquid constituting the droplets is an organic liquid, said intermediate comprising acid chloride being incorporated in said organic liquid, said continuous-phase liquid being aqueous, and said intermediate comprising an amino carboxylic acid being incorporated in said aqueous liquid after establishment of said droplets therein.

5. A process as defined in claim 1, in which carboxylic groups of said amino carboxylic acid react with said -COCl groups to produce supplemental anhydride linkage in said polyamide skin.

6. In a process of encapsulation by interfacial condensation of a pair of polyamide-forming intermediates respectively incorporated in two substantially immiscible liquids, the procedure in which one of the intermediates comprises diacid chloride and the other intermediate comprises diamino carboxylic acid selected from the group consisting of lysine, cystine, ornithine and 2,6-diamino-pimelic acid, said process comprising establishing droplets of one liquid containing one of the intermediates, in a continuous phase of the other liquid, and thereafter bringing together the second of the intermediates and said continuous liquid phase, for polyamide-forming reaction between the diacid chloride and the diamino carboxylic acid at the interfaces of the droplets and the continuous liquid phase, to encapsulate the droplets in a polyamide skin.

7. A process as defined in claim 6, in which said droplets are established by adding the first liquid to the other liquid and agitating the resulting mixture to produce a dispersion of said droplets, said second intermediate being thereafter added to said other liquid, said process including agitating said dispersion after said addition to promote said polyamide-forming reaction.

8. A process as defined in claim 6, in which said first liquid, forming the droplets, is an organic liquid containing the intermediate comprising diacid chloride, said other, continuous-phase liquid being aqueous and said other intermediate which comprises diamino carboxylic acid being added to said aqueous liquid after establishment of said droplets.

9. A process as defined in claim 8, in which said diamino carboxylic acid is lysine.

10. A process as defined in claim 9, in which said diacid chloride is adipoyl chloride.

11. A process as defined in claim 8, in which said aqueous continuous phase liquid is established to be alkaline not substantially later than the addition of said diamino carboxylic acid thereto.

12. A process as defined in claim 11, in which said establishment of alkalinity in said continuous phase liquid is effected by adding said diamino carboxylic acid thereto in solution with an alkaline compound of an alkali metal.

13. A process as defined in claim 8, in which carboxylic groups of diamino carboxylic acid with said diacid chloride to produce supplemental anhydride linkage in said polyamide skin.